(12) United States Patent
Breuer et al.

(10) Patent No.: US 7,950,223 B2
(45) Date of Patent: May 31, 2011

(54) METHOD AND APPARATUS FOR TEMPERATURE MANAGEMENT IN AN EXHAUST GAS POSTTREATMENT SYSTEM

(75) Inventors: Norbert Breuer, Ditzingen (DE); Markus Gloeckle, Stuttgart (DE); Buenyamin Duru, Gerlingen (DE); Martin Bohnet, Goeppingen (DE)

(73) Assignee: Robert Bosch GmbH, Stuttgart (DE)

( * ) Notice: Subject to any disclaimer, the term of this patent is extended or adjusted under 35 U.S.C. 154(b) by 259 days.

(21) Appl. No.: 12/084,961

(22) PCT Filed: Nov. 13, 2006

(86) PCT No.: PCT/EP2006/068379
§ 371 (c)(1),
(2), (4) Date: Mar. 6, 2009

(87) PCT Pub. No.: WO2007/054572
PCT Pub. Date: May 18, 2007

(65) Prior Publication Data
US 2009/0211230 A1    Aug. 27, 2009

(30) Foreign Application Priority Data

| Nov. 14, 2005 | (DE) | 10 2005 054 129 |
| Dec. 27, 2005 | (DE) | 10 2005 062 556 |
| Apr. 24, 2006 | (DE) | 10 2006 018 955 |
| May 4, 2006 | (DE) | 10 2006 020 693 |
| May 9, 2006 | (DE) | 10 2006 021 490 |
| May 11, 2006 | (DE) | 10 2006 021 987 |
| May 12, 2006 | (DE) | 10 2006 022 385 |
| May 17, 2006 | (DE) | 10 2006 022 992 |
| May 18, 2006 | (DE) | 10 2006 023 338 |
| Sep. 14, 2006 | (DE) | 10 2006 043 098 |

(51) Int. Cl.
*F01N 3/00* (2006.01)

(52) U.S. Cl. ............... 60/286; 60/274; 60/289; 60/293; 60/298; 60/303; 60/320

(58) Field of Classification Search ............ 60/274, 60/286, 289, 293, 295, 298, 303, 320, 324
See application file for complete search history.

(56) References Cited

U.S. PATENT DOCUMENTS 6,063,350 A * 5/2000 Tarabulski et al. ......... 423/239.1
7,213,395 B2 * 5/2007 Hu et al. ..................... 60/286
(Continued)

FOREIGN PATENT DOCUMENTS
DE         10237777 A1     2/2004
(Continued)

*Primary Examiner* — Binh Q Tran
(74) *Attorney, Agent, or Firm* — Ronald E. Greigg

(57) ABSTRACT

A method of and apparatus for controlling the reducing agent in an exhaust gas aftertreatment system of an internal combustion engine with an exhaust gas duct in which an SCR catalyst is provided in the direction of flow of the exhaust gas. A reducing agent-generating system (RGS) comprising an NOx and CO/H2 production unit as well as a combined NOx storage/ammonia production unit in the standard gas path of the reducing agent-generating system. Ammonia is delivered upstream from the SCR catalyst to reduce nitrogen oxides, starting materials for producing the ammonia being fed at least in part to the NOx and CO/H2 production unit via a fuel inlet and an air inlet. An AGC matrix of the combined NOx storage/ammonia production unit is cooled at least intermittently by means of an inner and/or outer cooling device. Cooling results in the longest possible section of the running length (L) and thus the largest possible volume percent of the AGX matrix within the combined NOx storage/ammonia production unit having an optimum temperature range regarding the highest possible ammonia yield, which overall contributes to a great ammonia production rate.

17 Claims, 2 Drawing Sheets

U.S. PATENT DOCUMENTS

| | | | | |
|---|---|---|---|---|
| 7,386,977 B2 * | 6/2008 | Ancimer et al. | ................ | 60/286 |
| 7,647,767 B2 * | 1/2010 | Osaku et al. | .................... | 60/286 |
| 7,805,930 B2 * | 10/2010 | Satou et al. | .................... | 60/286 |
| 7,849,674 B2 * | 12/2010 | Masuda et al. | .................. | 60/286 |
| 2005/0025692 A1 | 2/2005 | Becher et al. | | |
| 2006/0101809 A1 | 5/2006 | Bodo et al. | | |

FOREIGN PATENT DOCUMENTS

| | | |
|---|---|---|
| DE | 10313704 A1 | 10/2004 |
| DE | 10357402 A1 | 7/2005 |

* cited by examiner

METHOD AND APPARATUS FOR TEMPERATURE MANAGEMENT IN AN EXHAUST GAS POSTTREATMENT SYSTEM

CROSS-REFERENCE TO RELATED APPLICATION

This application is a 35 USC 371 application of PCT/EP 2006/068379 filed on Nov. 13, 2006.

BACKGROUND OF THE INVENTION

1. Field of the Invention

The invention relates to a method for temperature management in an exhaust gas posttreatment system of an internal combustion engine, having an exhaust gas duct in which an SCR catalytic converter is provided in the flow direction of the exhaust gas, and a reductant generating system (RGS) has both an $NO_x$ and $CO/H_2$ generating unit and a combined $NO_x$ reservoir/ammonia generating unit (AGC unit) in the standard gas course of the reductant generating system, and for reducing nitrogen oxides, ammonia is supplied as reductant by the reductant generating system upstream of the SCR catalytic converter, and the $NO_x$ and $CO/H_2$ generating unit is at least intermittently supplied via a fuel supply and an air supply with starting materials for generating the ammonia. The invention also relates to a corresponding apparatus.

2. Description of the Prior Art

For reducing nitrogen oxides in the exhaust gas of engines operated with a lean fuel mixture, $NO_x$ storage catalytic converters, also called $NO_x$ storage/reduction catalytic converters or NSCs, can be used. These $NO_x$ storage catalytic converters function discontinuously in a mode that comprises two phases: In the first, longer phase or so-called lean phase (Lambda>1), the nitrogen oxides from the engine that are contained in the exhaust gas are stored. In the second, shorter phase, the so-called rich phase (Lambda<1), the stored nitrogen oxides are regenerated by means of rich exhaust gas generated inside the engine. In the regeneration, in the conventional mode of operation of an NSC, only nitrogen ($N_2$), water ($H_2O$), and carbon dioxide ($CO_2$) are produced from the stored nitrogen oxides.

It is fundamentally known that under unfavorable regeneration conditions, such as a very long regeneration and/or low Lambda value ($\lambda \approx 0.8$), a more likely small proportion of the stored $NO_x$ can be converted to ammonia ($NH_3$). In that case, however, the $NH_3$ formation is an unwanted, parasitic effect.

In connection with future specifications in terms of nitrogen oxide emissions from motor vehicles, suitable exhaust gas posttreatment is necessary. Selective catalytic reduction (SCR) can be used to reduce $NO_x$ emissions (removal of nitric oxides) in internal combustion engines, especially diesel engines, with intermittently predominantly lean or in other words oxygen-rich exhaust gas. In this process, a defined quantity of a selective-action reductant is added to the exhaust gas. The reductant may for instance be in the form of ammonia, which is metered in directly in gaseous form, or is also obtained from a precursor substance in the form of urea or from a urea-water solution (UWS). Such UWS-SCR systems were used first in utility vehicles.

In German Patent Disclosure DE 10139142 A1, an exhaust gas cleaning system in an internal combustion engine is described, in which to reduce $NO_x$ emissions, an SCR catalytic converter is used, which reduces the nitrogen oxides that are in the exhaust gas to nitrogen using ammonia as the reagent. The ammonia is obtained from the urea-water solution (UWS) in a hydrolytic catalytic converter located upstream of the SCR catalytic converter. The hydrolytic catalytic converter converts the urea, contained in the UWS, into ammonia and carbon dioxide. In a second step, the ammonia reduces the nitrogen oxides to nitrogen, creating water as a byproduct. The precise sequence has been extensively described in the professional literature (see Weissweller in CIT (72), pages 441-449, 2000). The UWS is furnished in a reagent tank.

It is disadvantageous in this method that UWS is consumed in the operation of the internal combustion engine. Its consumption is approximately 4% of the fuel consumption. The supply of urea-water solution would have to be assured over a suitably large area, for instance at service stations. Another disadvantage of the method is the necessary operating temperature range. The hydrolytic reaction of the urea-water solution does not occur quantitatively at the hydrolytic catalytic converter, releasing ammonia, until temperatures of more than 200° C. In diesel engines, for instance, these exhaust gas temperatures are not reached until after a relatively long period of operation. At temperatures below 200° C., deposits can cause clogging of the metering unit, which at the very least is a hindrance to delivering the urea-water solution to the exhaust gas system. Adding the urea-water solution at temperatures below 200° C. can also, because of polymerization, inhibit the necessary catalytic properties of the hydrolytic catalytic converter of the SCR catalytic converter.

German Patent DE 199 22 961 C2 describes an exhaust gas cleaning system for cleaning the exhaust gas of a combustion source, in particular a motor vehicle internal combustion engine, of at least the nitrogen oxides contained in it, using an ammonia generating catalytic converter for generating ammonia, using ingredients of at least some of the exhaust gas emitted by the combustion source during ammonia-generating phases of operation, and also using a nitrogen oxide reducing catalytic converter downstream of the ammonia generating catalytic converter, for reducing nitrogen oxides contained in the emitted exhaust gas from the combustion source, using the generated ammonia as a reductant. In this system, a nitrogen oxide generating unit that is external to the combustion source is provided for enriching the exhaust gas, supplied to the ammonia generating catalytic converter, with nitrogen oxide generated by it during the ammonia generating phases of operation. A plasma generator is proposed for instance as the nitrogen oxide generating unit, for plasma technology oxidation of nitrogen, contained in a delivered gas stream, to nitrogen oxide. The hydrogen required for generating the ammonia is generated during the ammonia generated phases of operation by operating the combustion source with a rich or in other words fuel-rich air ratio.

A disadvantage of this method is the relatively high fuel consumption during the requisite rich phases of operation. Furnishing the nitrogen oxide to the engine externally also dictates high energy usage, especially since nitrogen oxide has to be produced in high concentration during the ammonia generating phases, which have to be as short as possible, and the remaining residual oxygen for generating ammonia has to be removed in a way that is expensive in terms of energy. If the hydrogen is generated via a $PO_x$ catalytic converter by means of partial oxidation reforming ($PO_x$), then a further disadvantage the heretofore poor dynamics of generating hydrogen results.

A method for generating a hydrogen-rich gas mixture using plasma chemistry is described in International Patent Disclosure WO 01/14702 A1. In it, a rich fuel-air mixture is treated in an electric arc, preferably under $PO_x$ conditions.

To avoid having to carry an additional fuel as well, a plasma method for on-board generation of reductants has been proposed in an as yet unpublished document of the present Applicant. In it, the ammonia required for reducing the nitrogen oxides is produced from nontoxic substances as needed in the vehicle and then is delivered to the SCR process. An acceptable solution in terms of fuel consumption is offered by a discontinuous method for ammonia generation, of the kind also proposed in the same document. This method will hereinafter be called the RGS method (Reductant Generating System), or reducing agent generating system.

One important component of an RGS unit is a catalytic converter, which while it does operate on the discontinuous fundamental principle of an $NO_x$ storage catalytic converter (NSC), is nevertheless operated such that the nitrogen oxides, stored in the lean phase, are converted in a targeted way in the rich reduction phases into ammonia, rather than into nitrogen oxide. The nitrogen oxides are produced under lean conditions, for instance from air, in a nitrogen oxide generating unit that is combined with a hydrogen/carbon monoxide generating unit to make an $NO_x$ and $CO/H_2$ generating unit. This $CO/H_2$ generating unit is also called a reductant generating unit. The gas mixture leaving this unit in the rich phases predominantly comprises $H_2$, CO, and $N_2$, and is also called reformate gas. The ammonia generated periodically (that is, cyclically) in this way is metered to the exhaust gas train of the engine and is converted with $NO_x$ from the engine to $N_2$ in the downstream SCR catalytic converter. This kind of $NO_x$ storage catalytic converter operated with maximum $NH_3$ is also called a combined $NO_x$ reservoir/ammonia generating unit (AGC stands for "ammonia generating catalyst").

The operating conditions of the combined $NO_x$ reservoir/ammonia generating unit for targeted generation of ammonia outside the exhaust gas train are extremely different from those of a conventional NSC in the full exhaust gas stream. Essentially, the differences are these:

an approximately 10 to 20 times higher concentration of $NO_x$ (up to 1%) and of $H_2/CO$ (totaling up to 40%);

typically markedly higher global $NO_x$ load densities of the $NO_x$ storage catalytic converter (up to 2 g $NO_2$ per liter of AGC volume), and associated with this, extremely exothermic heat tonalities over the length of the catalytic converter in the combined $NO_x$ reservoir/ammonia generating unit, with positive temperature gradients $\Delta T$ of over 100° C.

The ammonia yield in the combined $NO_x$ reservoir/ammonia generating unit depends on the temperature management at the combined $NO_x$ reservoir/ammonia generating unit, or the temperature profile over the length of the combined $NO_x$ reservoir/ammonia generating unit; on the duration of the rich phase; on the concentration of reductant agent; and on the catalytic converter formulation; the catalytic converter formulation generates a characteristic temperature profile and can affect the ammonia selectivity. It has been demonstrated that the formation selectivity is high enough only within a narrow temperature window.

It is therefore the object of the invention to furnish a method with which a high ammonia formation rate can be assured even under changing loading faces. It is also the object of the invention to furnish a suitable apparatus for carrying out the method.

SUMMARY OF THE INVENTION

The object of the invention pertaining to the method is attained in that an AGC matrix of the combined $NO_x$ reservoir/ammonia generating unit is cooled at least intermittently by means of an internal and/or external cooling device.

The object of the invention in terms of the apparatus is attained in that the combined $NO_x$ reservoir/ammonia generating unit has an internal and/or external cooling device, with which by means of a cooling medium, an AGC matrix in the combined $NO_x$ reservoir/ammonia generating unit can be cooled at least intermittently.

With the method and the apparatus of the invention, it can be attained that the highly exothermic heat tonality that occurs in ammonia formation at the AGC matrix (=substrate material+catalytic converter) in the combined $NO_x$ reservoir/ammonia generating unit can be delivered to a heat management means, so that a high ammonia yield and high ammonia selectivity can be attained. This is especially advantageous since normally the ammonia formation selectivity is high enough only within a narrow temperature window. The range in which the temperature window is traversed (that is, run-length portion or optimally tempered catalytic converter volume $V_{opt.}$) shrinks to a fraction, compared to the isothermic case in which continuous heat dissipation is attained by means of the proposed cooling. The consequence would be, among others, a considerable increase in the local space velocity, referred to this optimally usable catalytic converter volume $V_{opt.}$, which would reduce the ammonia yield and the ammonia formation rate considerably. As a result of the cooling, it can be attained that a run-length component (L) that is as large as possible, and thus a volumetric component of the AGC matrix that is as large as possible inside the combined $NO_x$ reservoir/ammonia generating unit have an optimal temperature range $\Delta T_{opt.}$ with a view to the highest possible ammonia yield, which overall contributes to a high ammonia generation rate.

A variant of the method provides that with the external cooling device, a reaction medium is carried to the combined $NO_x$ reservoir/ammonia generating unit via at least one heat exchanger, which with an AGC functionality of the combined $NO_x$ reservoir/ammonia generating unit is connected in series with or between the latter, and the heat exchanger is cooled by means of a cooling medium. The corresponding variant apparatus for the external cooling device provides at least one heat exchanger, which with an AGC functionality in the combined $NO_x$ reservoir/ammonia generating unit is connected in series or between the latter. In this intermittent cooling, regardless of the construction of the AGC matrix, efficient cooling to improve the ammonia yield during the phase of operation can be attained.

In the variant method with the internal cooling device inside the AGC matrix (internal cooling), the reaction medium and the cooling medium are carried separately in a heat exchanger structure, so that the generated heat can be dissipated from this integrated reactor construction inside the combined $NO_x$ reservoir/ammonia generating unit. The flow paths of the reaction medium and of the cooling medium are in direct heat exchange and are carried in the form of for instance parallel-extending conduit structures, in which in a first type of conduits and a second type of conduits, for instance adjacent each other, the reaction medium and the cooling medium, respectively, flow spatially separately (for instance, in a plate heat exchanger-like construction). The reaction medium and the cooling medium can be carried in countercurrent or in cocurrent fashion, which permits efficient heat dissipation.

It is especially advantageous if the flow of the cooling medium and thus the cooling output is modulated or regulated, or the flow direction of the cooling medium is reversed, as needed by means of a control unit. Thus an optimal temperature inside the AGC matrix with regard to the ammonia generating rate can be established inside the combined $NO_x$ reservoir/ammonia generating unit. Particularly with suitable temperature monitoring devices, a closed control loop can be attained that also controls the flow of cooling medium properly in terms of time.

For instance, it can be provided that the flow of cooling medium be stopped intermittently. This is advantageous whenever, in certain operating states, no heat is to be dissipated from the combined $NO_x$ reservoir/ammonia generating unit.

That is particularly the case whenever no ammonia production is taking place and at the same time no material streams are flowing through the reductant generating system, or when additional energy is input into the combined $NO_x$ reservoir/ammonia generating unit during a starting heating phase and/or intermediate heating phase. In the first case, within these intervals, heat losses are above all minimized, so that an intermittent stoppage of the flow of cooling medium is advantageous. In the second case, during a starting heating phase and/or intermediate heating phase, the additional input of energy, for instance by means of an additional burner functionality or by introducing hot exhaust gas from the exhaust gas duct, as is described in a document, likewise not yet published, of the present Applicant, the combined $NO_x$ reservoir/ammonia generating unit is meant to be brought to an optimal operating temperature as fast as possible, so that cooling in this phase would instead be counterproductive.

With a view to an overall optimization of the energy demand, it is advantageous if the energy of the heated cooling medium is used directly or indirectly via at least one additional heat exchanger for heating an engine cooling medium and/or for heating the air in a passenger compartment. As an alternative to this or in combination with it, in a further preferred variant method it may also be provided that the energy of the heated cooling medium be used to preheat an educt stream inside the reductant generating system. This in particular increases the reactivity inside the $NO_x$ and $CO/H_2$ generating unit inside the reductant generating system, for instance because of an improved formation of a mixture of diesel fuel and air.

A further preferred variant provides that cool ambient air as a cooling medium, after passing through the cooling device, is supplied as an educt to the $NO_x$ and $CO/H_2$ generating unit inside the reductant generating system. In this case, the air is called an internal cooling medium. Hence educt preheating can be attained to improve the reactivity inside the $NO_x$ and $CO/H_2$ generating unit.

It is especially advantageous if by means of a valve assembly inside the air supply, the stream of cool ambient air is reversed between a starting heating/intermediate heating air path and an operating air path, the valve assembly being triggered by the control unit. It is thus made possible during the starting heating/immediate heating phase, via this bypass, to carry the cooling medium past the combined $NO_x$ reservoir/ammonia generating unit and inject it directly into the reaction path of the reductant generating system.

If the method is employed in diesel engines or lean engines that have a reductant generating system (on-board ammonia generation), then the nitrogen oxide load in all phases of operation can be reduced markedly, since an optimal temperature range for a high ammonia generation rate can always be triggered, which is especially important for diesel engines. However, with lean engines as well, which are operated with regular or super fuel, the method in conjunction with the reductant generating system can offer advantages in terms of minimizing pollutants.

A preferred apparatus variant provides that the internal cooling device inside the AGC matrix has a heat exchanger structure, in which a reaction medium and the cooling medium are carried separately. This makes possible efficient heat exchange and hence a high cooling rate. Since with this kind of construction the cooling can take place directly inside the AGC matrix, the proportion of the optimal catalytic converter volume $V_{opt}$, in which a high ammonia generation rate is attained, can be enlarged markedly.

The cooling is especially effective if the cooling medium is a separate, external cooling medium. Air, water, or a thermal oil have proved to be especially advantageous as an external cooling medium.

If the AGC matrix inside the combined $NO_x$ reservoir/ammonia generating unit comprises a metal substrate material with a catalytic converter, then because of the higher thermal conductivity compared to ceramic substrates, temperature peaks (hot spots) occurring locally at the catalytic converter can be largely avoided.

It is especially advantageous if the AGC matrix comprises a monolithic honeycomb body with a matrix jacket that has an annular gap at least partially surrounding the matrix jacket. In this annular gap, the cooling medium can flow and absorb a portion of the heat liberated at the AGC matrix. In the chronological phases described above in which the cooling medium is not flowing, it can be attained, especially when air is used as the cooling medium, that in the annular gap, an air insulation layer develops that protects the AGC matrix against overly pronounced cooling.

If the cooling device has an additional heat exchanger through which the cooling medium can be carried, the heat dissipated to the cooling medium can additionally be used for educt preheating and/or for heating the engine cooling medium, for instance, or the air for the passenger compartment.

It is especially advantageous if the exhaust gas posttreatment system has a control unit, with which the flow of the cooling medium can be modulated or regulated or the flow direction of the cooling medium can be reversed, and the control unit communicates on the inlet side with at least one temperature sensor inside the reductant generating system or inside the combined $NO_x$ reservoir/ammonia generating unit, or both. Thus on the one hand monitoring of the temperature in the reductant generating system and on the other regulation of the cooling output for the combined $NO_x$ reservoir/ammonia generating unit can be achieved, so that with respect to ammonia generation, the temperature inside the AGC matrix can be managed in such a way that in every phase of operation, an optimal temperature range is maintained.

If the control unit is integrated with the reductant generating system or is a component of a higher-order engine controller, then even complex control and regulation tasks can be performed inside the exhaust gas posttreatment system, and it can be provided that signals from additional sensors can also be processed in the control unit.

The characteristics described above of the apparatus of the invention are particularly advantageous when employed with diesel engines or lean engines, if these engines have a reductant generating system. Combining both faster heating, particularly for the starting phase, on the one hand, and cooling, on the other, particularly in continuous operation, has the advantage that with one apparatus, different tasks can be accomplished with regard to an optimal function of the reductant generating system.

BRIEF DESCRIPTION OF THE DRAWINGS

The invention will be described in further detail below in terms of the exemplary embodiments shown in the drawings, in which.

DESCRIPTION OF THE PREFERRED EMBODIMENTS

Figure 1:
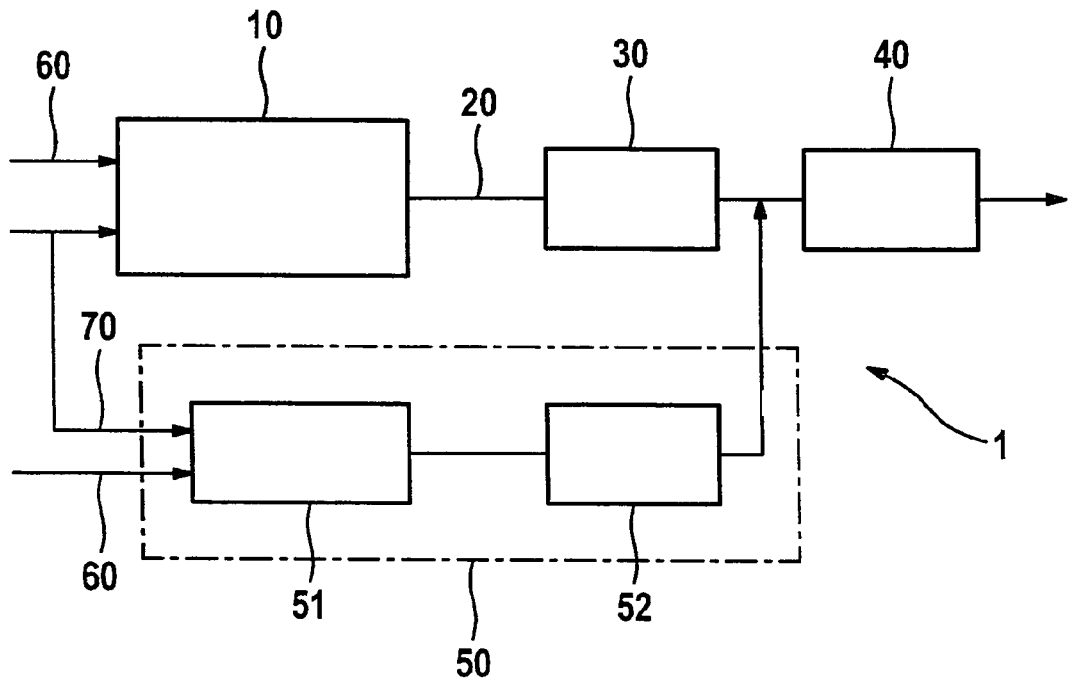
FIG. 1 is a schematic view of an exhaust gas posttreatment system of an internal combustion engine, with a reductant generating system.

FIG. 1 schematically illustrates the technical field, taking a diesel engine as an example, in which the method of the invention can be employed.

An exhaust gas posttreatment system 1 is shown for an internal combustion engine 10, whose exhaust gases are carried via an exhaust gas duct 20; a diesel particle filter 30 (DPF) and a downstream SCR catalytic converter 40, in that order in the flow direction of the exhaust gas, are provided. To reduce nitrogen oxides, ammonia can be delivered as a reductant upstream of the SCR catalytic converter 40 by a reductant generating system 50 (RGS). SCR catalytic converters 40 operate on the principle of selective catalytic reduction, in which by means of ammonia as the reductant, nitrogen oxides in oxygen-bearing exhaust gases are reduced to nitrogen and water.

The reductant generating system 50 in the example shown, in the flow direction, has an $NO_x$ and $CO/H_2$ generating unit 51, an oxidation catalytic converter (cPOx) (not shown in FIG. 1), and a combined $NO_x$ reservoir/ammonia generating unit 52 (AGC unit). Starting materials for generating the ammonia can be supplied at least intermittently to the $NO_x$ and $CO/H_2$ generating unit 51 via an air supply 70 and a fuel supply 60. The ammonia is generated from air, exhaust gas, or a mixture of air and exhaust gas, as well as in the example shown from diesel fuel. To that end, a hydrogen generating unit and a nitrogen oxide generating unit are provided. In the example shown, the $NO_x$ generating unit is embodied as a plasma reactor, in which $NO_x$ is generated from air by means of a glow discharge-like process. In this example as well, the plasma reactor contains the oxidation catalytic converter (cPOx) for $H_2/CO$ generation, located downstream of the $NO_x$ generating unit.

The generation of ammonia is effected inside the reductant generating system 50, in which nitrogen oxides $NO_x$ in a lean phase ($\lambda>1$) are generated from air in a plasma process inside the plasma reactor. These nitrogen oxides flow through the adjoining oxidation catalytic converter (cPOx) for the partial oxidation of fuel and next are delivered, in the example shown, to a combined $NO_x$ reservoir/ammonia generating unit 52 and stored. In a second phase of operation, the rich phase ($0.33<\lambda<1$) following the second phase of operation, liquid fuel is metered into the air in the region of the plasma reactor in an evaporation and mixture formation zone and converted at the oxidation catalytic converter (cPOx) into a gas mixture that contains hydrogen and carbon monoxide, and this mixture then, in the region of the combined $NO_x$ reservoir/ammonia generating unit 52, converts the previously-stored nitrogen oxides into ammonia. The gaseous ammonia generated is then metered into the exhaust gas stream in the exhaust gas duct 20 upstream of the SCR catalytic converter 40.

Since the SCR catalytic converter 40 has an ammonia storage capability, it is possible even by way of a discontinuous method for generating ammonia to achieve the continuous reduction of the nitrogen oxides in the exhaust gas stream by means of the SCR process. In it, in the temperature range between 150° C. and 450° C., catalytic converters comprising titanium dioxide ($TiO_2$) and vanadium pentaoxide ($V_2O_5$), for instance, convert the nitrogen oxides with the generated ammonia at a high rate.

Figure 2:
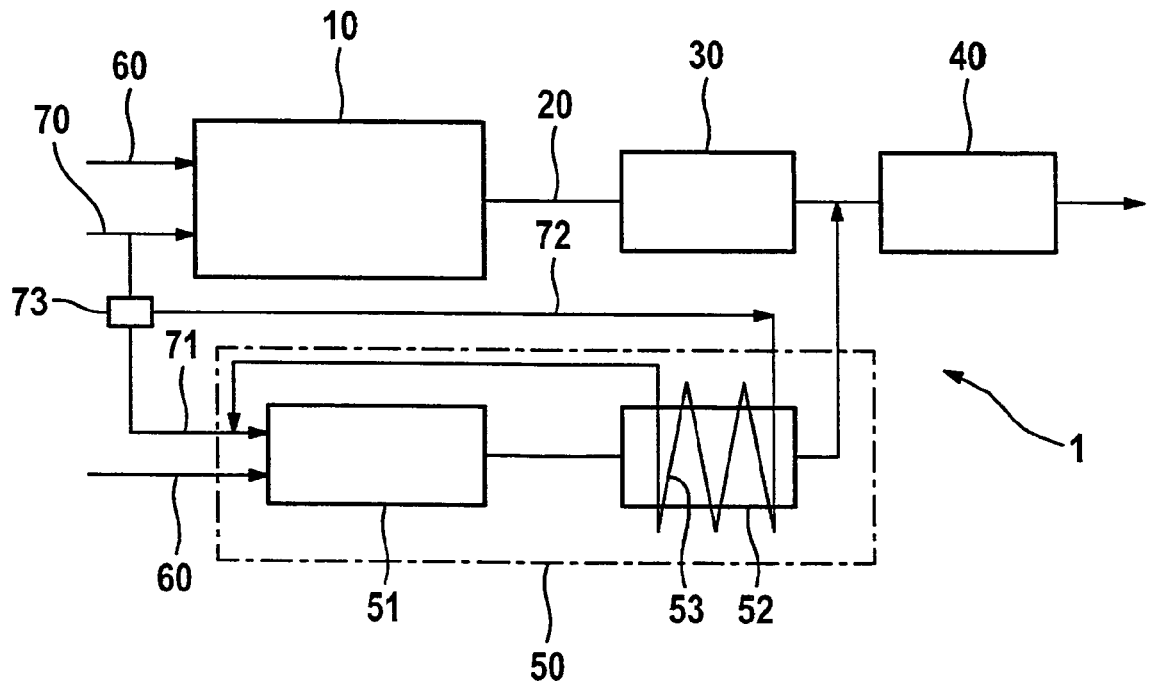
FIG. 2, a schematic view of an exhaust gas posttreatment system with an active AGC cooling device.

FIG. 2 shows an apparatus according to the invention for temperature management in the exhaust gas posttreatment system 1, in which the combined $NO_x$ reservoir/ammonia generating unit 52 has an internal and/or external cooling device 53, with which, by means of a cooling medium, an AGC matrix in the combined $NO_x$ reservoir/ammonia generating unit 52 can be at least intermittently cooled.

The cooling device 53 embodied as an external cooling device can comprise at least one heat exchanger, which with an AGC functionality in the combined $NO_x$ reservoir/ammonia generating unit 52 is connected in series with or between the latter (intermittent cooling).

The cooling device 53 embodied as an internal cooling device has a heat exchanger structure inside the AGC matrix; the cooling device 53 has separate conduit structures extending parallel to it, and in them the reaction medium and the cooling medium are carried separately, in countercurrent or in cocurrent fashion. The cooling medium may be a separate, external cooling medium, such as air, water, or a thermal oil.

In a preferred variant embodiment, the AGC matrix inside the combined $NO_x$ reservoir/ammonia generating unit 52 comprises a metal substrate material, on which the catalytic converter function is applied by means of coating. The AGC matrix comprises a monolithic honeycomb body with a matrix jacket, which has an annular gap at least partially surrounding the matrix jacket, through which the cooling medium can flow.

In the exemplary embodiment shown, the exhaust gas posttreatment system 1, inside the air supply 70, has a valve assembly 73, with which a starting heating/intermediate heating air path 71 or an operating air path 72 can be selected. In the case of the operating air path 72, cool ambient air as an internal cooling medium, after passing through the cooling device 53, can be supplied as an educt to the $NO_x$ and $CO/H_2$ generating unit 51 inside the reductant generating system 50.

The valve assembly 73 is triggerable by a control unit, not shown here, with which the flow of cooling medium can be modulated or regulated as needed or the flow direction of the cooling medium can be reversed as needed; the control unit communicates on the inlet side with at least one temperature sensor inside the reductant generating system 50 or inside the combined $NO_x$ reservoir/ammonia generating unit 52. The control unit can be integrated with the reductant generating system 50 or is a component of a higher-order engine controller.

It may be provided that the flow of the cooling medium is stopped intermittently. This is the case especially if no ammonia production is taking place and at the same time no streams of material are flowing through the reductant generating system 50, or when additional energy is input into the combined $NO_x$ reservoir/ammonia generating unit 52 during a starting heating and/or intermediate heating phase.

A further variant embodiment, in the cooling device 53, provides at least one additional heat exchanger, through which the cooling medium can be carried, so that the energy of the heated cooling medium can be used directly or indirectly for heating an engine cooling medium and/or for heating the air in a passenger compartment. In addition or alternatively, the energy of the heated cooling medium can be used to preheat an educt flow inside the reductant generating system 50.

Figure 3:
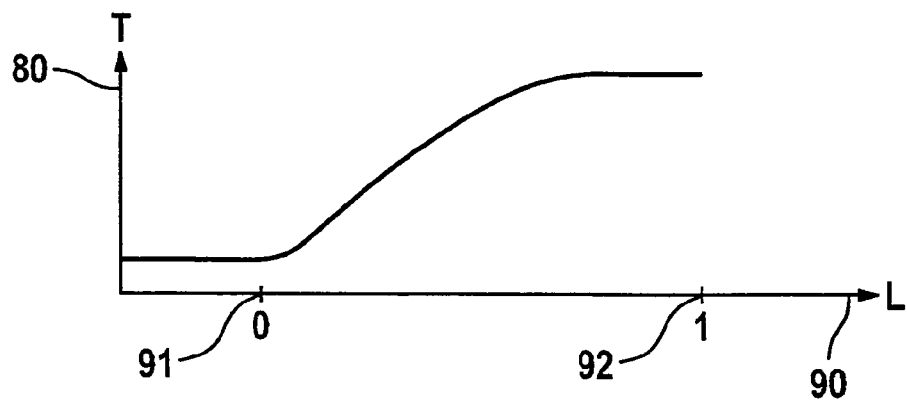
FIG. 3, a temperature gradient over a run-length of a monolithic honeycomb body of a combined $NO_x$ reservoir/ammonia generating unit.

FIG. 3 shows a temperature gradient over the running length of a monolithic honeycomb body in ammonia formation at an $NO_x$ storage catalytic converter operated cyclically as a combined $NO_x$ reservoir/ammonia generating unit 52. In the graph, the maximum temperature (T) 80 is plotted over a run-length component (L) 90. The maximum temperature (T) 80 rises after entering at 91 and reaches its highest value before exiting at 92 from the catalytic converter functionality.

Figure 4:
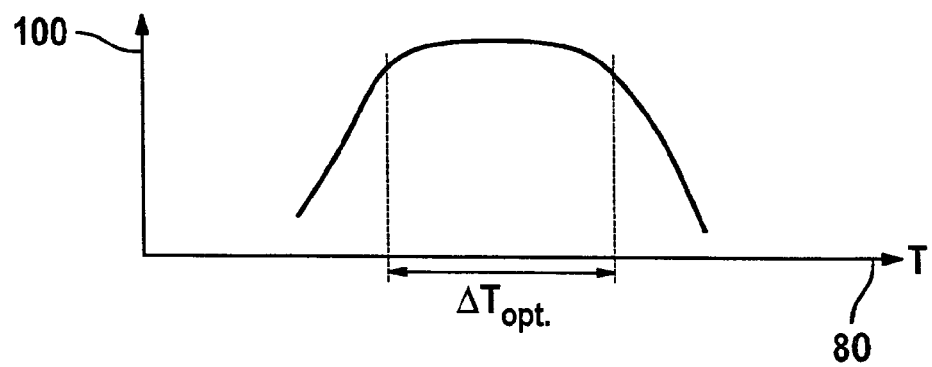
FIG. 4, a functional relationship between the ammonia yield and the temperature.
Figure 5:
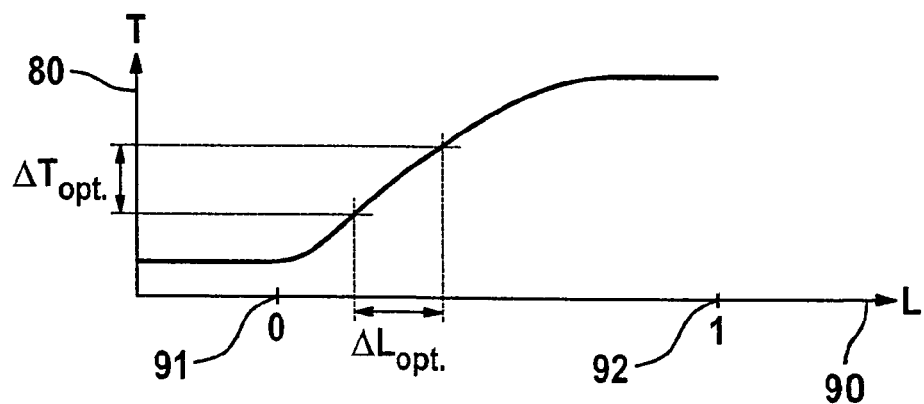
FIG. 5, the temperature gradient over the running length of the monolithic honeycomb body of the combined $NO_x$ reservoir/ammonia generating unit, with an optimal run-length range and an optimal temperature range.

The ammonia yield 100 is extremely dependent on an optimal temperature range, as is shown taking as an example the functional relationship between the ammonia yield 100 and the maximum temperature (T) 80 in FIG. 4. Above and below an optimal temperature range $\Delta T_{opt.}$, the ammonia yield 100 drops sharply.

In FIG. 3, the temperature gradient is shown over the run-length of the monolithic honeycomb body of the combined $NO_x$ reservoir/ammonia generating unit 52 with an optimal run-length range $\Delta L_{opt.}$ and an optimal temperature range $\Delta T_{opt.}$ for the sake of the highest possible ammonia yield 100.

By suitable cooling during the phase of operation or by targeted additional input of heat during the cold-starting or restarting phase of the exhaust gas posttreatment system 1, it can be attained with the above-described variant apparatuses and variant methods that as large as possible a run-length component (L) 90 and thus as large as possible a volumetric component of the monolithic honeycomb body inside the combined $NO_x$ reservoir/ammonia generating unit 52 have an optimal temperature range $\Delta T_{opt.}$ for as high as possible an ammonia yield 100, which overall contributes to a high ammonia generation rate.

In principle, the variant apparatuses and variant methods described above can be used in all motor vehicles that have diesel or lean engines and that are operated with different fuels in which a reductant generating system 50 is used for on-board ammonia generation.

The foregoing relates to the preferred exemplary embodiment of the invention, it being understood that other variants and embodiments thereof are possible within the spirit and scope of the invention, the latter being defined by the appended claims.

The invention claimed is:

1. A method for temperature management in an exhaust gas posttreatment system of an internal combustion engine, having an exhaust gas duct in which an SCR catalytic converter is provided in a flow direction of the exhaust gas, and a reductant generating system has both an $NO_x$ and $CO/H_2$ generating unit and a combined $NO_x$ reservoir/ammonia generating unit in a standard gas course of the reductant generating system, and for reducing nitrogen oxides, ammonia is supplied as reductant by the reductant generating system upstream of the SCR catalytic converter, and the $NO_x$ and $CO/H_2$ generating unit is at least intermittently supplied via a fuel supply and an air supply with starting materials for generating the ammonia, the method comprising at least intermittently cooling an AGC matrix of the combined $NO_x$ reservoir/ammonia generating unit by means of an internal and/or external cooling device, and passing cool ambient air as a cooling medium through the cooling device and supplying the cool ambient air as an educt to the $NO_x$ and $CO/H_2$ generating unit inside the reductant generating system, and by means of a valve assembly inside the air supply, a stream of cool ambient air is reversed between a starting heating/intermediate heating air path and an operating air path, the valve assembly being triggered by a control unit.

2. The method as defined by claim 1, wherein with the external cooling device, a reaction medium is carried to the combined $NO_x$ reservoir/ammonia generating unit via at least one heat exchanger, which with an AGC functionality of the combined $NO_x$ reservoir/ammonia generating unit is connected in series with or between the latter, and wherein the heat exchanger is cooled by means of a cooling medium.

3. The method as defined by claim 1, wherein, in a case of the internal cooling device inside the AGC matrix, a reaction medium and a cooling medium are carried separately in a heat exchanger structure.

4. The method as defined by claim 3, wherein the reaction medium and the cooling medium are carried in countercurrent or cocurrent fashion.

5. The method as defined by claim 1, wherein a flow of the cooling medium is modulated or regulated as needed, or the flow direction of the cooling medium is reversed as needed, by means of the control unit.

6. The method as defined by claim 2, wherein a flow of the cooling medium is modulated or regulated as needed, or the flow direction of the cooling medium is reversed as needed, by means of the control unit.

7. The method as defined by claim 3, wherein a flow of the cooling medium is modulated or regulated as needed, or the flow direction of the cooling medium is reversed as needed, by means of the control unit.

8. The method as defined by claim 4, wherein a flow of the cooling medium is modulated or regulated as needed, or the flow direction of the cooling medium is reversed as needed, by means of a control unit.

9. An apparatus for temperature management in an exhaust gas posttreatment system of an internal combustion engine, the system having an exhaust gas duct in which an SCR catalytic converter is provided in a flow direction of the exhaust gas, and a reductant generating system has both an $NO_x$ and $CO/H_2$ generating unit and a combined $NO_x$ reservoir/ammonia generating unit in the standard gas course of the reductant generating system, and for reducing nitrogen oxides, ammonia can be supplied as a reductant by the reductant generating system upstream of the SCR catalytic converter, and the $NO_x$ and $CO/H_2$ generating unit can be at least intermittently supplied via a fuel supply and an air supply with starting materials for generating the ammonia, wherein the combined $NO_x$ reservoir/ammonia generating unit comprises an internal and/or external cooling device, with which by means of a cooling medium, an AGC matrix in the combined $NO_x$ reservoir/ammonia generating unit can be cooled at least intermittently, and an AGC matrix of the combined $NO_x$ reservoir/ammonia generating unit is cooled at least intermittently by means of an internal and/or external cooling device employing cool ambient air as the cooling medium is cool ambient air, which ambient air after passing through the cooling device, can be supplied as an educt to the $NO_x$ and $CO/H_2$ generating unit inside the reductant generating system, and a valve assembly inside the air supply operable to reverse a stream of cool ambient air between a starting heating/intermediate heating air path and an operating air path, the valve assembly being triggered by the control unit, the valve assembly being operable to select a starting heating/intermediate heating air path or an operating air path, the valve assembly being triggerable by a control unit.

10. The apparatus as defined by claim 9, wherein the external cooling device comprises at least one heat exchanger, which with an AGC functionality in the combined $NO_x$ reservoir/ammonia generating unit, is connected in series with or between the latter.

11. The apparatus as defined by claim 9, wherein the internal cooling device inside the AGC matrix has a heat exchanger structure, in which a reaction medium and the cooling medium are carried separately.

12. The apparatus as defined by claim 9, wherein the exhaust gas posttreatment system comprises a control unit, with which a flow of the cooling medium can be modulated or regulated or the flow direction of the cooling medium can be reversed, and wherein the control unit communicates on the inlet side with at least one temperature sensor inside the reductant generating system or inside the combined $NO_x$ reservoir/ammonia generating unit, or both.

13. The apparatus as defined by claim 10, wherein the exhaust gas posttreatment system comprises a control unit, with which a flow of the cooling medium can be modulated or regulated or the flow direction of the cooling medium can be reversed, and wherein the control unit communicates on the inlet side with at least one temperature sensor inside the reductant generating system or inside the combined $NO_x$ reservoir/ammonia generating unit, or both.

14. The apparatus as defined by claim 11, wherein the exhaust gas posttreatment system comprises a control unit, with which a flow of the cooling medium can be modulated or regulated or the flow direction of the cooling medium can be reversed, and wherein the control unit communicates on the inlet side with at least one temperature sensor inside the reductant generating system or inside the combined $NO_x$ reservoir/ammonia generating unit, or both.

15. The apparatus as defined by claim 12, wherein the control unit is integrated with the reductant generating system or is a component of a higher-order engine controller.

16. The apparatus as defined by claim 13, wherein the control unit is integrated with the reductant generating system or is a component of a higher-order engine controller.

17. The apparatus as defined by claim 14, wherein the control unit is integrated with the reductant generating system or is a component of a higher-order engine controller.

* * * * *